United States Patent [19]

Shelton

[11] Patent Number: 4,694,659

[45] Date of Patent: Sep. 22, 1987

[54] DUAL BED HEAT PUMP

[76] Inventor: Samuel V. Shelton, 1183 Burnt Creek Ct., Decatur, Ga. 30033

[21] Appl. No.: 904,673

[22] Filed: Sep. 8, 1986

Related U.S. Application Data

[63] Continuation-in-part of Ser. No. 729,921, May 3, 1985, Pat. No. 4,610,148.

[51] Int. Cl.$^4$ .................... F25B 17/00; F25B 17/08
[52] U.S. Cl. .................................. 62/106; 62/480
[58] Field of Search ............ 62/101, 106, 480, 115, 62/118

[56] References Cited

U.S. PATENT DOCUMENTS

| 1,833,901 | 12/1931 | Hull | 62/480 X |
| 2,024,083 | 12/1935 | Young | 62/106 |
| 2,131,119 | 9/1938 | Root et al. | 62/106 |
| 3,828,566 | 8/1974 | Wetzel | 62/106 X |
| 4,183,227 | 1/1980 | Bouvin et al. | 62/480 |

Primary Examiner—Lloyd L. King
Attorney, Agent, or Firm—B. J. Powell

[57] ABSTRACT

A heat pump method and system with a pair of solid adsorbent beds connected to a heat pump loop and a reversible heat transfer loop. The heat transfer loop has a heater connected between one end of the beds and a cooling heat exchange connects the other end of the beds so that a heat transfer fluid flowing around the heat transfer loop heats one bed and cools the other.

17 Claims, 7 Drawing Figures

DUAL BED HEAT PUMP

CROSS REFERENCE TO RELATED APPLICATION

This application is a continuation-in-part of my co-pending application Ser. No. 779,921, filed May 3, 1985, U.S. Pat. No. 4,610,148 issued Sept. 9, 1986.

BACKGROUND OF THE INVENTION

This invention relates generally to heat pumps and more particularly to heat pumps which use beds of solid adsorbent to drive the heat pump loop in response to the heating and cooling of beds.

Heat driven heat pumps which use solid adsorbent beds to adsorb and desorb a refrigerant are known in the art. These solid adsorbent beds exhibit the phenomena of adsorbing and desorbing refrigerant vapor in response to the changes in the temperature of the adsorbent. One common example of such solid adsorbent material is molecular sieves, commonly known as zeolite. Other materials which exhibit this phenomena are silica gel, alumina and activated carbon. Most any liquid which can be vaporized can be used as the refrigerant. Water is commonly used as a refrigerant with zeolite while sulfur dioxide is commonly used as a refrigerant with silica gel.

Because such beds desorb refrigerant vapor when heated and adsorb refrigerant vapor when cooled, they can be used to drive the refrigerant around a heat pump loop to heat or cool a selected space. In the heat pump loop the refrigerant is desorbed from the bed as it is heated to drive refrigerant out of the bed to a condenser to condense the vapor. The condensed refrigerant is then expanded through an expansion valve and passes on to an evaporator where the refrigerant is again vaporized. When the bed is cooled, refrigerant vapor from the condenser is adsorbed into the bed to complete the cycle. Because a bed cannot readily adsorb and desorb refrigerant at the same time, two solid adsorbent beds are typically used with one being heated while the other is cooled. The heating and cooling steps are reversed when the beds are heated and cooled to the desired temperature limits during a cycle.

A number of different arrangements have been proposed for heating and cooling the beds of solid adsorbent. One common technique uses a heat transfer fluid with a heat exchange arrangement between the fluid and each solid adsorbent bed so that heat is exchanged between the heat transfer fluid and the bed as the heat transfer fluid is circulated through the heat transfer arrangement. The heat transfer fluid is also connected to an external cooling heat exchanger to cool the fluid and an external heater to heat the fluid. The heat transfer loop may be operated in two different ways. One way is to circulate part of the heat transfer fluid heated by the heater through the bed to be heated and then directly back to the heater for reheating while circulating another part of the heat transfer fluid cooled by the cooling heat exchanger through the bed to be cooled and then directly back to the cooling heat exchanger. Another way is to circulate the heated heat transfer fluid from the heater through the bed being heated, then through the cooling heat exchanger to finish cooling the heat transfer fluid, then through the bed being cooled, and finally back to the heater to finish heating the heat transfer fluid. Such an arrangement is illustrated in U.S. Pat. No. 4,183,227 issued Jan. 15, 1980 to J. Bouvin et al.

None of these prior art systems suggests any particular design criteria for the bed and heat exchanger or method of operation therefor except that the beds are simply heated or cooled until the entire bed has reached the end temperature limits of the cycle step. Good engineering practice suggest that the average heat transfer rate between the heat transfer fluid and the bed be kept as high as possible. This suggests that heat should be transferred between the fluid and bed at all times while the fluid and bed are in a heat transfer relationship with each other. As a result, temperature gradients lengthwise of the bed are to be avoided. Using this criteria, the heating coefficient of performance (COP) is typically on the order of 1-1.5 while the cooling COP is typically on the order of 0.1-0.5. The system performance based on this operation has not been able to economically compete with mechanical compressor heat pump systems.

SUMMARY OF THE INVENTION

These and other problems and disadvantages associated with the prior art are overcome by the invention disclosed herein by providing a heat driven heat pump system which is designed so as to produce a thermal gradient or wave lengthwise of the solid adsorbent beds. While the system is operating within design parameters, the heating/cooling capacity can be simply changed by varying the heat transfer fluid flow rate without any change in coefficient of performance. The bed heat exchangers are designed to produce an optimum thermal wavelength during the initial heating or cooling of the bed. The temperature criteria of the heat transfer fluid exiting the bed at which the fluid flow is usually reversed is selected to maximize the steady state coefficient of performance for that particular design. The heat pump system also has the capacity of operating at an increased heating capacity within the heating mode without requiring an external heat source and while maximizing the COP and maintaining at least a COP of about 1 while operating outside the efficient operating range. The method of operating the solid adsorbent heat driven heat pump system according to the invention produces coefficients of performance (COP) greatly increased over prior art operating methods so that the invention is able to economically complete with mechanical compressor heat pump systems. The invention thus involves:

(1) The physical design of the bed heat exchangers to produce thermal waves with a wavelength less than about 0.8 times the bed length;
(2) The reversing of the heat transfer fluid flow is selected so that the ratio of the exit temperature shift to the operating temperature differential is at least about 0.2;
(3) Varying heat transfer fluid flow rate to change heating and cooling capacity below the system design parameter;
(4) Varying the reversing temperature criteria to vary heating capacity above the system design parameter; and
(3) Varying the temperature of the heat transfer fluid leaving the heater to vary capacity above and below the system design parameter.

The apparatus for carrying out the invention includes a pair of adsorbent beds which are connected to a vapor compression cycle heat pump loop to drive same and a heat transfer loop which alternately heats and cools the solid adsorbent beds to drive the vapor compression cycle heat pump loop. The heat transfer loop includes a bed heat exchanger associated with each solid adsorbent hed, a heater between one of the ends of the beds and a cooling heat exchanger between the other of the ends of the beds. A reversible pump arrangement pumps a heat transfer fluid around the heat transfer loop.

The arrangement of the bed heat exchangers and the solid adsorbent beds is designed so that the correlation parameter of the fluid Peclet number of the fluid passing through each bed divided by one plus the thermal conductance ratio of the solid adsorbent bed with the heat transfer fluid passing through the bed is greater than ten and less than the bed Biot number/10. The system is operated so that the flow of the heat transfer fluid is not reversed until the exit temperature of the heat transfer fluid passing out of either of the beds shifts from the initial temperature of that bed by at least twenty percent of the difference between the initial bed temperature and the inlet fluid temperature. The system can also be operated to increase the heating capacity of the system beyond the design parameters simply by increasing the amount the exit temperature of the heat transfer fluid passing out of either of the beds is allowed to shift above the twenty percent value of the difference between the initial bed temperature and the inlet fluid temperature. The system can also be operated so that the heating and cooling capacity below the design parameters for the system is achieved simply by varying the flow rate of the heat transfer fluid passing through the system without significantly changing system operating efficiency.

These and other features and advantages of the invention will become more apparent upon consideration of the following description and accompanying drawings wherein like characters of reference designate corresponding parts throughout the several views and in which:

These figures and the following detailed description disclose specific embodiments of the invention, however, the inventive concept is not limited thereto since it may be embodied in other forms.

DETAILED DESCRIPTION OF ILLUSTRATIVE EMBODIMENTS

Figure 1:
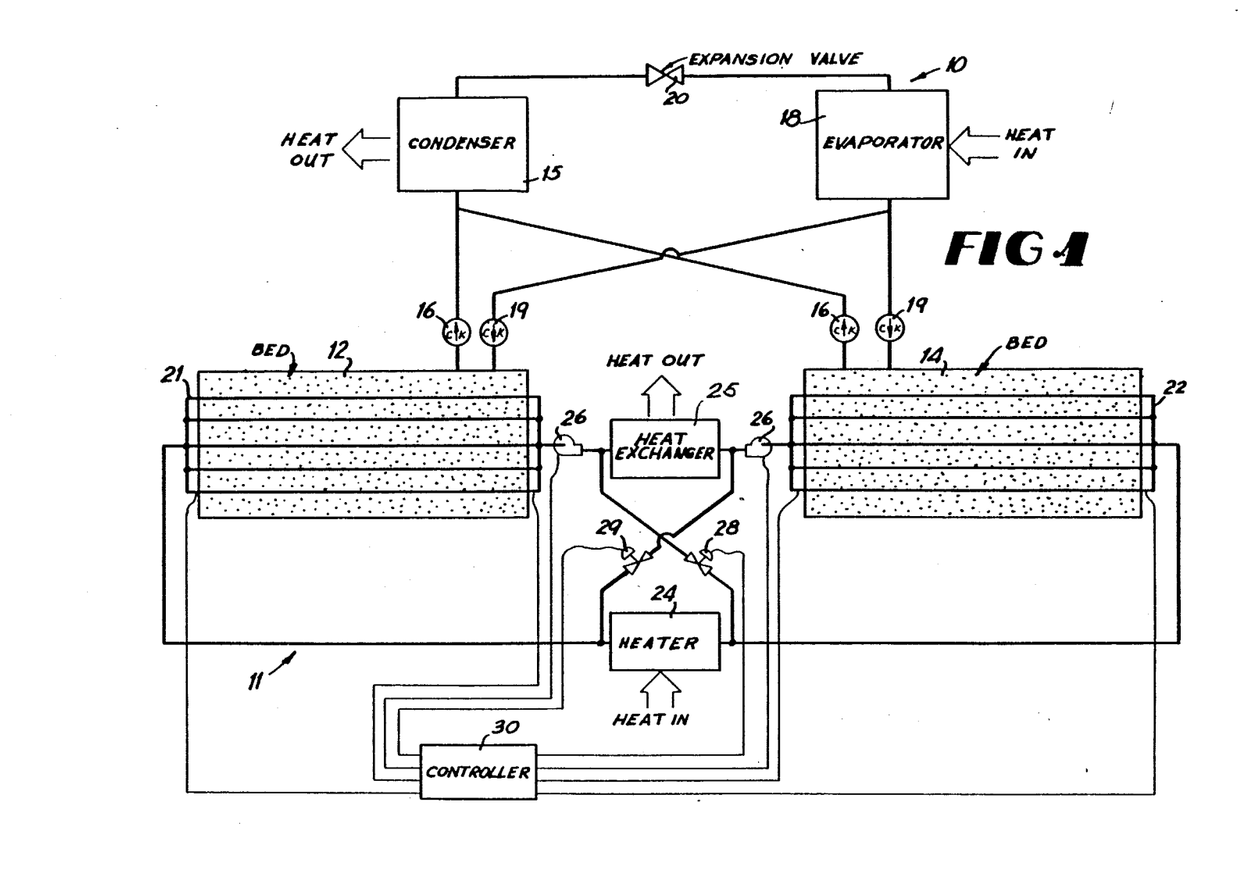
FIG. 1 is a schematic drawing illustrating the apparatus of the invention.

Referring to FIG. 1 it will be seen that the apparatus for practicing the invention includes a heat pump loop 10 and a heat transfer loop 11. The heat pump loop 10 includes a pair of solid adsorbent beds 12 and 14, a condenser 15 connected to both of the beds 12 and 14 in parallel through check valves 16 that allow refrigerant vapor to flow only from the beds 12 and 14 to the condenser, an evaporator 18 connected to both of the beds 12 and 14 through check valves 19 that allow refrigerant vapor to flow only from the evaporator into the beds, and an expansion valve 20 connecting the condenser and evaporator to allow the refrigerant to flow from the condenser to the evaporator. While one of the beds 12 and 14 is heated, the other is cooled so that refrigerant vapor desorbed from the bed being heated flows to the condenser 15 while refrigerant vapor from the evaporator 18 flow to the bed being cooled to be adsorbed therein.

The heat transfer loop 11 includes a pair of bed heat exchangers 21 and 22 respectively associated with the beds 12 and 14 to place a heat transfer fluid in a heat exchange relation with the beds 12 and 14. A heater 24 connects the heat exchangers 21 and 22 between one end of the beds 12 and 14 while a cooling heat exchanger 25 connects the heat exchangers 21 and 22 between the other ends of the beds. One or more pumps 26 are provided for pumping the heat transfer fluid around the heat transfer loop in either direction. A modulating bypass valve 28 connects the common point in loop 11 between the bed heat exchanger 21 and the cooling heat exchanger 25 with the common point between the heater 24 and the bed heat exchanger 22. A similar modulating bypass valve 29 connects the common point in loop 11 between the bed heat exchanger 22 and cooling heat exchanger 25 with the common point between heater 24 and the bed heat exchanger 21. A controller 30 is provided for operating pumps 26 and valves 28 and 29. The controller 30 has temperature pickups at the opposite ends of the beds 12 and 14 to monitor the fluid temperature of the heat transfer fluid as it exists the beds. As will become more apparent, the controller 30 controls the pumps 26 and the valves 28 and 29 in response to the exit fluid temperature to reverse the flow of heat transfer fluid around the heat transfer loop 11 and to control the amount of heat transfer fluid that will bypass one of the beds.

The basic disclosure of this system is set forth in my copending application Ser. No. 729,921. The disclosure of this earlier application is specifically incorporated herein by reference and will not be again described in detail herein.

The solid adsorbent material used in the beds 12 and 14 may be any such material which adsorbs and desorbs a refrigerant vapor. Any liquid which condenses and vaporizes over the pressure and temperature range available in the heat pump loop of the system and which is chemically compatible with the solid adsorbent material may be used as the refrigerant. Several adsorbent/refrigerant pairs have been used satisfactorily in the invention. These include natural and synthetic zeolite with water; natural and synthetic zeolite with ammonia; activated carbon with ammonia; and activated carbon with methylene chloride (R-30). The specific solid adsorbents and refrigerants disclosed, however, are not meant to be limiting.

Using a typical condensing temperature of about 100° F. and evaporating temperature of about 40° F., it will be seen that the various adsorbent/refrigerant pairs operate in different pressure and temperature ranges. In the zeolite/water pair, the pressure range is about 0.12–0.95 psia and the bed temperature range is about 100°–600° F. In the zeolite/ammonia pair, the pressure range is about 73–212 psia and the bed temperature range is about 100°–600° F. In the carbon/ammonia system, the pressure range is about 73–212 psia while the bed temperature range is 100°–450° F. In the carbon/methylene chloride pair, the pressure range is about 3.4–13.7 psia and the bed temperature range is about 100°–450° F. The carbon/methylene chloride pair has the capability of purging noncondensibles such as air and the like from the system at atmospheric pressure simply by operating the condenser at slightly above atmospheric pressure.

Heat is transferred into the heat transfer fluid by the heater 24 and is transferred out of the heat transfer fluid by the cooling heat exchanger 25 with a low coefficient of performance of about one. On the other hand, heat is transferred by the condenser 15 and evaporator 18 with a high coefficient of performance. Therefore, minimizing the heat transferred by the heater 24 and heat exchanger 25 and maximizing the heat transferred by the condenser 15 and evaporator 18 serves to maximize the overall COP of the system. The method of the invention disclosed herein minimizes the temperature drop across both the cooling heat exchanger 25 and the temperature rise across heater 24 while at the same time maintaining the thermal wave in the beds especially when steady state conditions are achieved.

As was explained, one of the beds 12 or 14 is being heated while the other bed 12 or 14 is being cooled. After one bed has been heated and the other bed cooled, the heat transfer fluid flow is reversed so that the heated bed is cooled and the cooled bed is heated. Each bed is substantially heated during the heating portion of its operating cycle to the upper operating temperature $T_H$ while the bed is at condenser pressure and is substantially cooled during the cooling portion of its operating cycle to the lower operating temperature $T_L$ while the bed is at evaporator pressure. As will become more apparent, reversing the fluid flow serves to initially adiabatically depressurize the bulk of the hot bed down to evaporator pressure and adiabatically pressurize the bulk of the cool bed up to condenser pressure. This results in the temperature of the bulk of the hot bed being lowered to an intermediate upper temperature $T_H'$ during this initial depressurization while the temperature of the bulk of the cool bed is raised to an intermediate lower temperature $T_L'$ during this initial pressurization. From the foregoing, it will be seen that the fluid temperature entering the bed being heated must be at least as high as the desired upper operating temperature and that the fluid temperature entering the bed being cooled must be at least as low as the desired lower operating temperature.

As noted in my earlier application Ser. No. 729,921, the heat exchangers 21 and 22 placing the heat transfer fluid in a heat exchange relationship with the beds 12 and 14 must meet certain criteria to insure that a thermal wave tw will be established in the bed as the heat transfer fluid passes through the bed. For sake of simplicity, the thermal wavelength tw is the axial bed distance between the point where the dimensionless fluid temperature $T_f$ is equal to 0.9 to the point where temperature $T_f$ is equal to 0.1 where:

$$T_f = \frac{t_b - t_i}{t_o - t_i} \quad (1)$$

$t_b$ = bed temperature at a selected axial position
$t_i$ = initial bed temperature at start of cycle
$t_o$ = fluid temperature entering bed As more fully set forth in my co-pending application Ser. No. 729,921, it has been found that the nature of the temperature profile along the length of the bed is a function of the bed Biot number Bi, the fluid Peclet number Pe, the thermal diffusivity ratio DR between the bed and fluid and the thermal conductance ratio KA between the bed and fluid. The thermal wavelength tw can be expressed as a non-dimensional wavelength TW where:

$$TW = \frac{tw}{\text{bed length}} \quad (2)$$

The thermal wavelength TW can be correlated using a correlation parameter CP where:

$$CP = \frac{Pe}{1 + KA} \quad (3)$$

Figure 2:
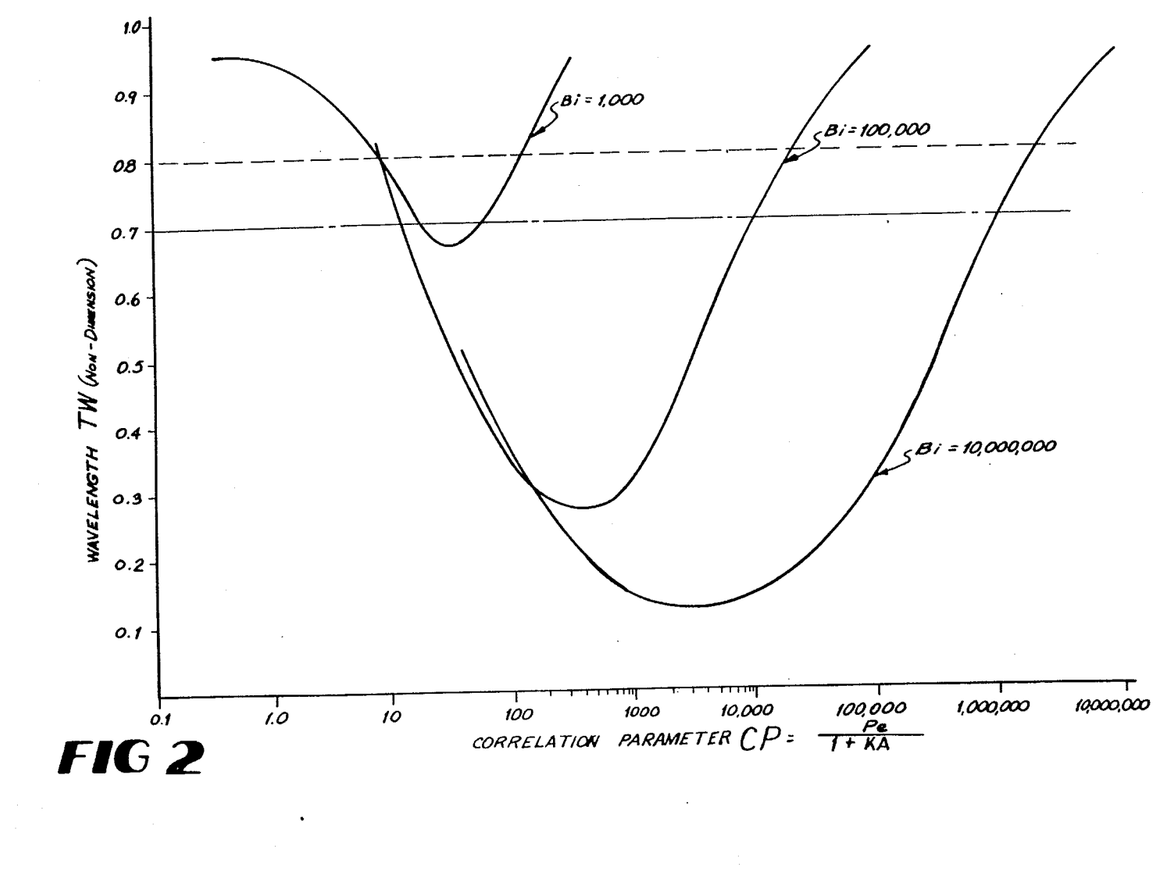
FIG. 2 is a chart correlating thermal wavelength with the key correlating wavelength parameter.

Since thermal wavelength TW is a function of both the bed Biot number Bi and the correlating parameter CP, FIG. 2 shows thermal wavelength curves for three Biot numbers. While the thermal conductance ratio KA was selected at 1,000 and the thermal diffusivity ratio DR was selected at 100 and held fixed in FIG. 2, plots for other values of the ratios KA and DR show curves qualitatively and quantitatively similarly to those shown. It will thus be seen that the wavelength TW can be produced by selecting the proper correlation parameter CP and the Biot number at that particular thermal wavelength.

Figure 3:
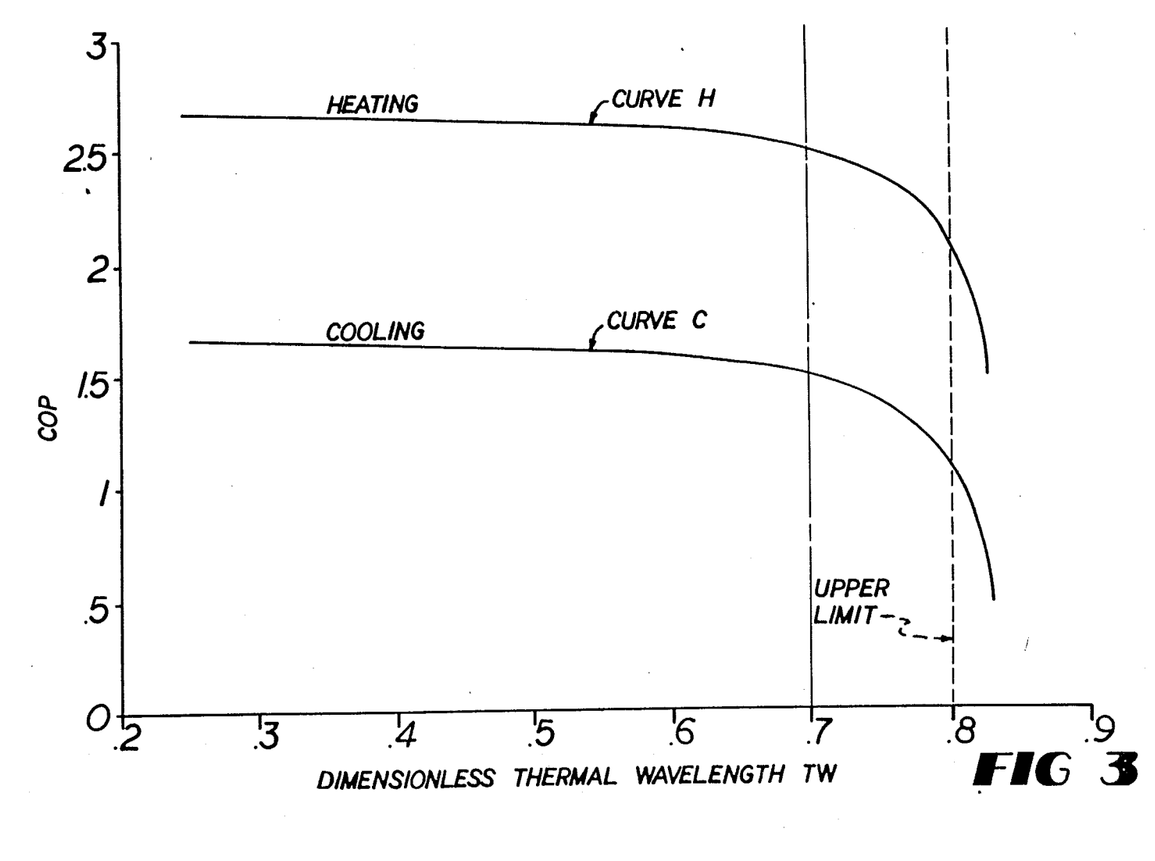
FIG. 3 is a chart correlating coefficient of performance with thermal wavelength.

It has also been found that thermal wavelength affects the overall coefficient of performance of the system. These tests and calculations are incorporated in FIG. 3 which plots COP against the thermal wavelength TW. It will be seen from FIG. 3 that a thermal wavelength TW should not have a value greater than 0.8 because the COP has dropped more than an acceptable amount. Preferably, the thermal wavelength TW should be less than 0.7 to maximize COP. When these values are superimposed on FIG. 2, it will be seen that in no case should a correlation parameter CP be selected so that the Biot number curve associated therewith produces wavelength TW greater than 0.8 and preferably less than 0.7.

When the wavelength criteria of 0.8 and 0.7 are applied to FIG. 2, it will be seen that the upper and lower limits of the range of values of the correlation parameter CP is established. This relationship can be expressed as:

$$10 < CP < \frac{Bi}{10} \quad (4)$$

In actual practice, the initial wavelength is usually selected to be as short as reasonably practical given the difficulty of designing for the variables that must be selected. An initial wavelength $TW_i$ of less than about 0.5 is usually selected in the design to permit wider variation in steady state wavelength as will become more apparent.

It will be appreciated that the thermal wavelengths that have been discussed up to this point are the thermal wavelengths that occur in the initial first pass of the thermal wave through the bed where the entire bed is at a uniform temperature. While this value sets the minimum wavelength $TW_i$ that can be achieved, this wavelength typically increases as the operation of the beds move toward a steady state. The steady state wavelength $TW_{ss}$ can be related to the initial thermal wavelength $TW_i$, as the wavelength ratio WR where:

$$WR = \frac{TW_{ss}}{TW_i} \quad (5)$$

The wavelength ratio WR has been found to be a function of the reversing temperature $T_{rev}$ at which the heat transfer fluid flow is reversed. This temperature can be non-dimensionally expressed as the reversing criteria $TR_{REV}$ where:

$$TR_{REV} = \frac{T_{rev} - T_L}{T_H - T_L} \text{ (heating cycle)} \quad (6)$$

$$TR_{REV} = \frac{T_H - T_{rev}}{T_H - T_L} \text{ (cooling cycle)}$$

Figure 4:
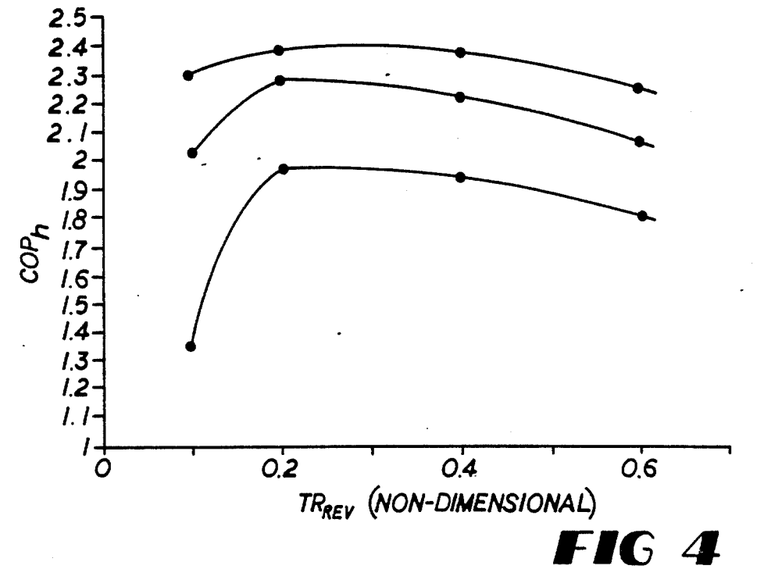
FIG. 4 is a chart correlating reversing temperature criteria with heating coefficient of performance.
Figure 5:
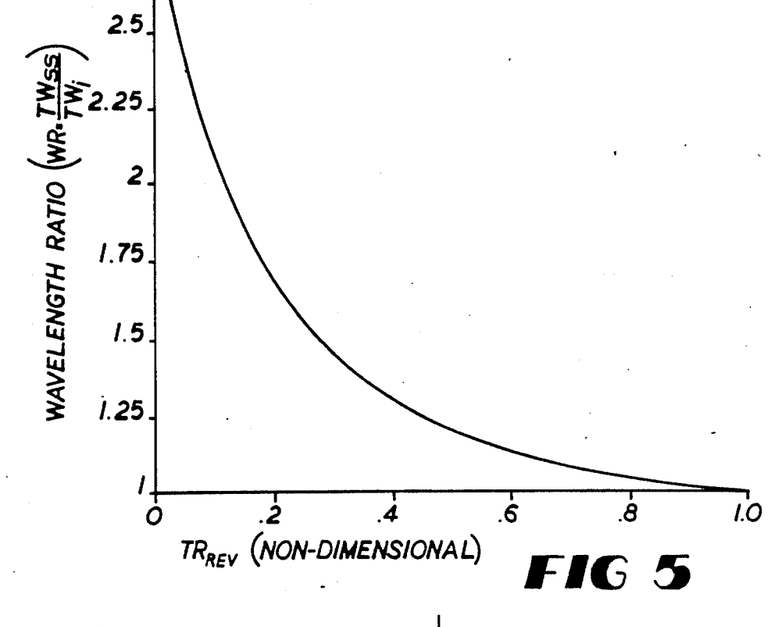
FIG. 5 is a chart correlating reversing temperature criteria with steady state/initial pass wavelength ratio.

FIG. 5 expresses the wavelength ratio WR as a function of the reversing criteria $TR_{REV}$. It will be appreciated that when the reversing criteria $TR_{REV}$ is 1.0, the thermal wave has completely passed out of the end of the bed before the fluid flow is reversed. On the other hand, when the reversing criteria $TR_{REV}$ approaches 0, the steady state thermal wavelength $TW_{ss}$ becomes infinitely large. This effect will best be appreciated by reference to FIG. 4 which plots the heating $COP_h$ against the reversing criteria $TR_{REV}$. The different curves represent different initial wavelengths $TW_i$. More specifically, curve 1 has an initial wavelength $TW_i$ of 0.39 whereas curve 2 has an initial wavelength $TW_i$ of 0.34 and curve 3 has an initial wavelength $TW_i$ of 0.29. From FIG. 4, it will be seen that the reversing criteria $TR_{REV}$ should be at least about 0.2 in order to insure reasonable COP's. Thus, a portion of the thermal wave passing through the bed must be allowed to pass out of the end of the bed in order to maximize the COP of the system.

The curves in FIG. 4 can be explained when one realizes that a high COP thermal wave is not being developed within the bed in the steady state condition until the reversing criteria $TR_{REV}$ reaches about 0.2. Even though the high COP thermal wave is developed within the bed after $TR_{REV}$ reaches about 0.2, the COP will be reduced at $TR_{REV}$ increases due to the increasing amount of heat being rejected through the heat exchanger 25 as $TR_{REV}$ keeps increasing. From FIG. 5, it will be seen that $TR_{REV}$ should be in a range of about 0.2–0.6.

Figure 6:
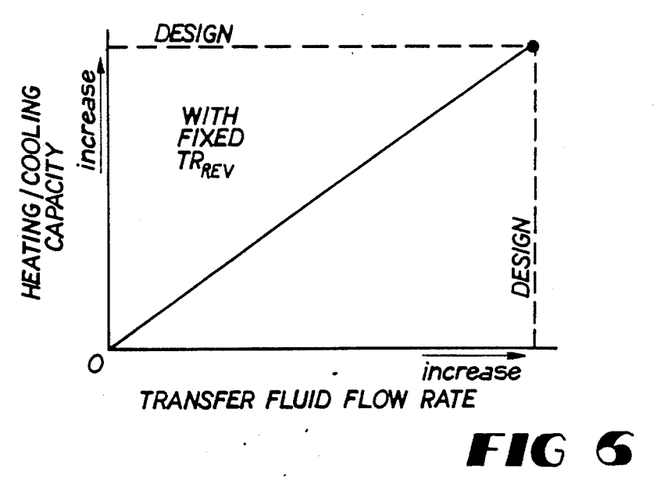
FIG. 6 is a chart correlating system heating and cooling capacity with heat transfer fluid flow rate.

It will be appreciated that each system is designed for a particular set of operating conditions both as to temperature spread and capacity. In actual operation, however, the system must be able to operate away from the design point of the system. FIG. 6 plots heating/cooling capacity against heat transfer fluid flow rate for operation below the design point of the system. By varying flow rate, the heating and/or cooling capacity of the system can be linearly varied when the reversing criteria $TR_{REV}$ remains fixed. Varying capacity using the variation in heat transfer fluid flow rate also effectively changes operating capacity of the system without significantly varying its COP.

Figure 7:
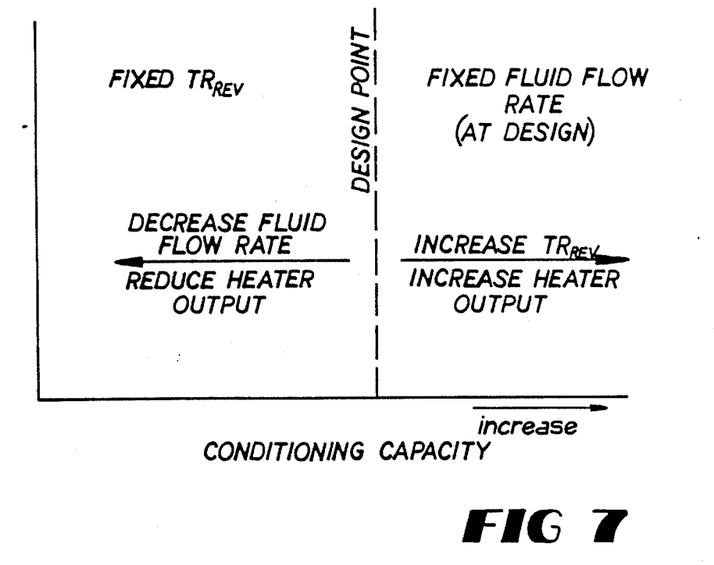
FIG. 7 is a chart demonstrating change in system capacity above and below design parameters.

The chart of FIG. 7 illustrates the operation of the system both above and below the design point for the system. It will be seen that the capacity of the system can be reduced while keeping the reversing criteria fixed by either decreasing the fluid flow rate of the heat transfer fluid or reducing the temperature $T_H$ of the heat transfer fluid passing out of the heater and vice versa. To raise the capacity of the system above the design point, the fluid flow rate is fixed at the design condition and the reversing criteria is raised or the heat transfer fluid temperature $T_H$ increased. By allowing just enough of the thermal wave to pass out of the end of the bed before the system is reversed to allow the capacity to be increased up to a specified demand serves to minimize the effect of the system operating off design conditions.

I claim:

1. A method of operating a heat pump system including a heat pump loop and a heating loop where the heat pump loop includes a pair of solid adsorbent beds connected to a condenser and an evaporator with an expansion device therebetween so that refrigerant flows from the bed being heated to the condenser while the refrigerant can flow from the evaporator to the bed being cooled, and where the heating loop includes a heat exchanger associated with each bed design so that when a heat transfer fluid is flowing therethrough, a thermal temperature gradient or wave will be generated along the bed together with a cooling heat exchanger between one of the ends of the beds and a heating means between the other ends of the beds comprising the steps of:

circulating the heat transfer fluid around the heating loop until the exit temperature of the heat transfer fluid passing out of either of the beds shifts from the initial temperature of that bed by at least about twenty percent (20%) of the difference between the initial bed temperature and inlet fluid temperature; and then reversing the flow of the heat transfer fluid around the heating loop each time the exit temperature of the heat transfer fluid passing out of either of the beds shifts from the initial temperature of that bed by at least about twenty percent (20%) of the difference between the initial bed temperature and inlet fluid temperature.

2. A method of operating a heat pump system between an upper operating temperature and a lower operating temperature comprising two solid adsorbent beds connected to the condenser and evaporator in a heat pump circuit so that desorbed refrigerant can flow from the bed being heated into the condenser and refrigerant from the evaporator can flow into the bed being cooled comprising the steps of:

placing a separate heat exchanger in a heat transfer relationship with each bed and connecting the heat exchangers in series with each other in a closed fluid loop so that heat transfer fluid flows around the closed loop serially through the heat exchangers; and configuring the beds and heat exchangers so that the correlation parameter of the fluid Peclet number of the fluid passing through each bed divided by one plus the thermal conductance ratio of the solid adsorbent bed with the heat transfer fluid passing through the bed is greater than ten and less than the bed Biot number/10.

3. A heat pump system comprising:
   a pair of solid adsorbent beds;
   a heat pump circuit connected to said solid adsorbent beds so that said heat pump circuit is driven in response to the heating and cooling of said beds;
   a heat transfer fluid;

a pair of bed heat exchange means, one of said bed heat exchange means operatively associated with each of said beds so that the heat transfer fluid passing through each of said heat exchange means passes lengthwise of said bed associated therewith in a single pass and each of said heat exchange means having opposed ends;

heating means adapted to heat said heat exchange fluid to a prescribed upper operating temperature connecting one of the ends of both of said bed heat exchange means;

cooling means adapted to cool said heat exchange fluid to a prescribed lower operating temperature connecting the other of the ends of both of said bed heat exchange means so that said heat transfer fluid can flow serially from said heating means, through one of said bed heat exchange means, through said cooling means, through the other of said bed heat exchange means and back to said heating means to define a heat transfer circuit;

circulation means for alternatively circulating said heat transfer fluid is one direction around the heat transfer circuit so that one of said beds is cooled while the other of said beds is heated, and in the alternate direction around the heat transfer circuit so that said other of said beds is cooled while said one of said beds is heated where the circulation rate of the heat transfer fluid is such that the heated heat transfer fluid passing into the end of one of said heat exchange means heats said solid adsorbent bed associated therewith from an initial cool bed temperature in the vicinity of the lower operating temperature while said bed cools the heat transfer fluid from the upper operating temperature down to about the initial cool bed temperature in a distance less than 0.8 times the length of said bed and with the cooled heat transfer fluid passing into the end of the other of said heat exchanger means cooling said solid adsorbent bed associated therewith from an initial hot bed temperature in the vicinity of the upper operating temperature while said bed heats the heat transfer fluid from the lower operating temperature up to about the initial hot bed temperature in a distance less than 0.8 times the length of the bed in order for heat exchanged between said heat transfer fluid and each of said beds to generate a thermal wave in the temperature profiles lengthwise of said beds moving through each of said beds; and control means operatively associated with said heat transfer fluid passing out of said beds and with said circulation means to cause said circulation means to reverse the circulation direction of said heat transfer fluid around said heat transfer circuit when either of the thermal wave reaches that end of said bed from which said heat transfer fluid exits.

4. A method of operating a heat pump system including a heat pump loop and a heating loop where the heat pump loop includes a pair of solid adsorbent beds connected to a condenser and an evaporator with an expansion device therebetween so that refrigerant flows from the bed being heated to the condenser while the refrigerant can flow from the evaporator to the bed being cooled, and where the heating loop includes a heat exchanger associated with each bed designed so that when a heat fluid is flowing therethrough, a thermal temperature gradient or wave will be generated along the bed together with a cooling heat exchanger between one of the ends of the beds and a heating means between the other ends of the beds comprising the steps of:

circulating the heat transfer fluid around the heating loop to drive the heat pump loop; and varying the heat transfer fluid flow rate to vary the heating and cooling capacity of the system.

5. A method of operating a heat pump system including a heat pump loop and a heating loop where the heat pump loop includes a pair of solid adsorbent beds connected to a condenser and an evaporator with an expansion device therebetween so that refrigerant flows from the bed being heated to the condenser while the refrigerant can flow from the evaporator to the bed being cooled, and where the heating loop includes a heat exchanger associated with each bed designed so that when a heat fluid is flowing therethrough, a thermal temperature gradient or wave will be generated along the bed together with a cooling heat exchanger between one of the ends of the beds and a heating means between the other ends of the beds comprising the steps of:

circulating the heat transfer fluid around the heating loop at a prescribed flow rate to drive the heat pump loop; and varying the heat output of the heating means to vary the heating and cooling capacity of the system.

6. A method of operating a heat pump system including a heat pump loop and a heating loop where the heat pump loop includes a pair of solid adsorbent beds connected to a condenser and an evaporator with an expansion device therebetween so that refrigerant flows from the bed being heated to the condenser while the refrigerant can flow from the evaporator to the bed being cooled, and where the heating loop includes a heat exchanger associated with each bed designed so that when a heat fluid is flowing therethrough, a thermal temperature gradient or wave will be generated along the bed together with a cooling heat exchanger between one of the ends of the beds and a heating means between the other ends of the beds comprising the steps of:

circulating the heat transfer fluid around the heating loop until the exit temperature of the heat transfer fluid passing out of either of the beds shifts from the initial temperature of that bed by a prescribed percentage of the difference between the initial bed temperature and inlet fluid temperature;

then reversing the flow of the heat transfer fluid around the heating loop each time the exit temperature of the heat transfer fluid passing out of either of the beds shifts from the initial temperature of that bed by said prescribed percentage of the difference between the initial bed temperature and inlet fluid temperature; and varying the heating capacity of the system by varing said prescribed percentage whereby the heating capacity is increased as said prescribed percentage is increased and vice versa.

7. The method of claim 1 further including the step of configuring the beds and heat exchangers so that the correlation parameter of the fluid Peclet number of the fluid passing through each bed divided by one plus the thermal conductance ratio of the solid adsorbent bed with the heat transfer fluid passing through the bed is greater than ten and less than the bed Biot number/10.

8. The method of claim 1 further including the step of configuring the beds and heat exchangers so that the thermal wave generated in the beds has a wavelength less than about 0.8 times the bed length.

9. The method of claim 1 further including the step of varying the heat transfer fluid flow rate to vary the heating and cooling capacity of the system.

10. The method of claim 1 further including the step of varying the heating capacity of the system by varying the percentage above twenty percent (20%) of the exit temperature shift of the heat transfer fluid with respect to the difference between initial bed temperature and inlet fluid temperature before the flow of heat transfer fluid is reversed.

11. The method of claim 1 further including the step of varying the output temperature of the heat transfer fluid from the heating means to vary the heating and cooling capacity of the system.

12. The method of claim 8 wherein the thermal wavelength is less than about 0.7 times the bed length.

13. The method of claim 7 wherein the step of configuring the beds further includes configuring the beds and heat exchangers so that the thermal wave generated in the beds has a wavelength after the beds reach steady state operation of less than about 0.7 times the bed length.

14. The method of claim 13 further including the step of varying the heat transfer fluid flow rate to vary the heating and cooling capacity of the system.

15. The method of claim 15 where the system is designed based on a prescribed set of operating parameters and further includes the step of varying the heating and cooling capacity of the system by:
 (a) varying the heating and cooling capacity by varying the heat transfer fluid flow rate when the system is operating below said prescribed set of operating parameters; and
 (b) varying the heating capacity by varying the percentage above twenty percent (20%) of the exit temperature shift of the heat transfer fluid with respect to the difference between initial bed temperature and inlet fluid temperature before the flow of heat transfer fluid is reversed when the system is operating above said prescribed set of operating parameters.

16. The System of claim 3 wherein said control means is constructed and arranged to reverse the direction of heat transfer fluid flow when the exit temperature of the heat transfer fluid passing out of either of the beds shifts from the initial temperature of that bed by at least about twenty percent (20%) of the difference between the initial bed temperature and inlet fluid temperature.

17. The system of claim 3 wherein the thermal wavelength is less than about 0.7 times the bed length.

* * * * *